United States Patent [19]
Pareigat

[11] Patent Number: 4,743,102
[45] Date of Patent: May 10, 1988

[54] ZOOM LENS HAVING MAGNIFICATION FACTORS IN THE RANGE OF 12X TO 24X FOR MICROGRAPHIC APPLICATIONS

[75] Inventor: Gerhardt H. Pareigat, St. Paul, Minn.

[73] Assignee: Minnesota Mining and Manufacturing Company, St. Paul, Minn.

[21] Appl. No.: 33,416

[22] Filed: Apr. 1, 1987

[51] Int. Cl.$^4$ .................. G02B 15/14; G02B 17/08
[52] U.S. Cl. .................................................. 350/423
[58] Field of Search .................................... 350/423

[56] References Cited

U.S. PATENT DOCUMENTS

| | | | |
|---|---|---|---|
| 3,354,776 | 11/1967 | Smitzer et al. | 88/24 |
| 3,360,325 | 12/1967 | Gustafson | 350/423 |
| 3,482,901 | 12/1969 | Melech . | |
| 3,582,203 | 6/1971 | Cox | 353/25 |
| 3,724,927 | 4/1973 | Cox . | |

Primary Examiner—John K. Corbin
Assistant Examiner—Rebecca D. Gass
Attorney, Agent, or Firm—Donald M. Sell; James A. Smith; Stephen W. Buckingham

[57] ABSTRACT

A zoom lens system which provides magnification factors in the range of 12 to 24. The lens system of the invention is particularly useful in micrographic reader/printers.

2 Claims, 1 Drawing Sheet

ZOOM LENS HAVING MAGNIFICATION FACTORS IN THE RANGE OF 12X TO 24X FOR MICROGRAPHIC APPLICATIONS

TECHNICAL FIELD

The present application relates to lens systems for use with micrographic projectors and printers and more particularly to such lens systems having variable focal lengths.

BACKGROUND ART

In order to conserve space, documents are often stored photographically with their size greatly reduced on microfilm, microfiche, or other media. Such processes and media are known generally by the term micrographics.

In order to utilize a document which has been stored in micrographic format, a projector or reader is required. Such a reader will produce an enlarged reproduction of the reduced image on a screen for viewing by the operator. Often such readers also include a printer. When a desired document has been located by projection onto the screen the operator may produce a permanent enlarged copy through photographic or plain paper copier techniques. Systems which permit such reading and printing are known as reader/printers. The term reader/printer will be used herein to denote both readers containing only a projector and those including a printer in addition to a projector.

A problem which arises in the use of such systems relates to the fact that different reduction factors may be used in recording the micrographic images. As a result different magnifications are required in order to properly reproduce such images. In order to accommodate such variations, lenses having a variety of magnifications are commonly provided with micrographic reader/printers. In some cases as many as fifteen or more lenses are required to accommodate all possible reduction factors which may be used. The frequent changing of lenses can create a great inconvenience to operators of such equipment and can increase the time required for reading and printing documents stored in micrographic form.

DISCLOSURE OF INVENTION

The present invention provides a zoom lens for use in micrographic applications. The zoom lens of the present invention provides magnification factors in the range of 12 to 24. The lens varies from a focal length of 36.7 mm with an aperture of f4.6 to a focal length of 73.4 with an aperture of f9.2. The use of such a zoom lens reduces the number of lenses required to view or print micrographic images having different reduction factors. An additional advantage of such a lens arises in reader/printers having a printer which utilizes plain paper copier techniques. In such printers, toner usage is minimized by allowing the operator to optimize image size, thereby eliminating the dark borders often associated with such printers.

DETAILED DESCRIPTION

Figure 1:
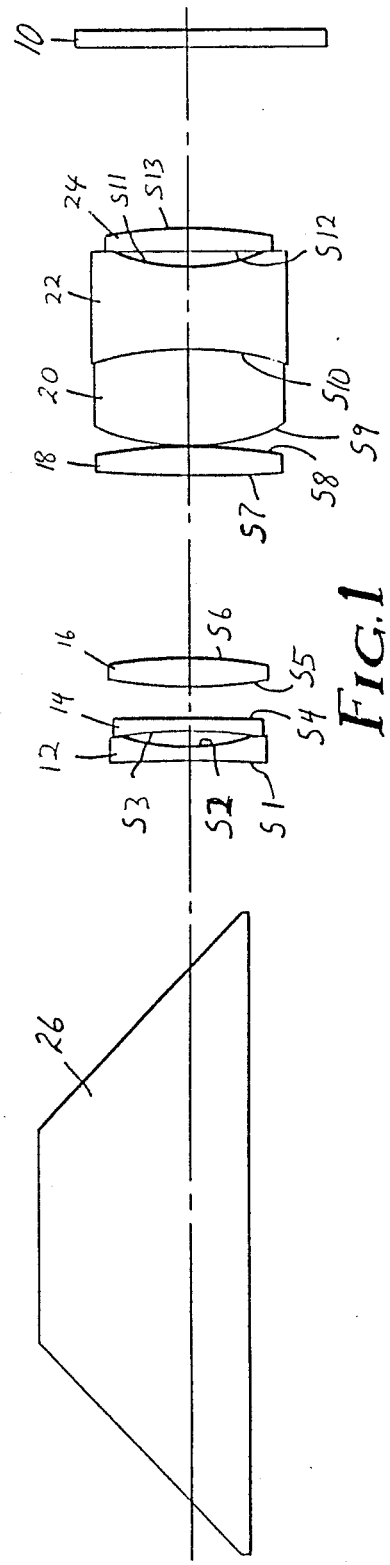
FIG. 1 is a schematic representation of the lens system of the invention.

The lens system of the present invention provides a variable magnification or zoom lens for use in micrographic reader/printers. The preferred embodiment of the present invention is illustrated in FIG. 1. A film containing micrographic images is placed in film plane 10 and light from a light source, not shown, is projected therethrough. Elements 12, 14, 16, 18, 20, 22, and 24 operate together to enlarge the image used for projection on a screen or for reproduction by a printer. The amount of the enlargement is determined by the spacing between elements 16 and 18. The magnification factor of the lens system of the invention may vary between 12 and 24.

Detailed information on the lens system of the present invention is shown in the Table below. The values for the radii of curvature, the thickness, the separations, or air space between the elements, the tolerances for element thicknesses and separations and the decentration tolerances are given in millimeters. The values for the tilt tolerances are given in degrees. The Table entries for index of refraction include two values. The first is the actual index of refraction of the element while the second is the dispersion. The tolerances for all indicies of refraction are equal to ±0.0005. In order to read the information in the Table it should be understood that each element of FIG. 1 comprises two surfaces. Thus, element 12 comprises surfaces S1 and S2 having the radii of curvature shown in the Table. This element is 1.20±0.1. mm thick on its optical axis. It is made from glass having an index of refraction of 1.83400 with a dispersion of 37.3±0.2. Finally it has a maximum decentration of 0.015 mm and a maximum tilt of 0.066°. Element 14 is separated from element 12 by an air space of 0.98±0.025 mm on the optical axis of the system. This separation is measured from surface S2 of element 12 to surface S3 of element 14 on the optical axis of the system. Similarly the data regarding the remaining elements and the separations between them may be determined from the information provided in the Table. Those skilled in the art will perceive that deviations from the dispersion values specified in the Table will not necessarily prevent the construction of a functional lens system. Such deviations may, however, introduce chromatic aberration and reduce the resolution of the system.

Elements 20 and 22 form a cemented doublet and, as such, share a common surface, S11. The maximum decentration and tilt values given for element 20 actually apply to the doublet as a whole.

The Table indicates that the separation between elements 16 and 17 may vary between 2.000 mm and 27.896 mm. The value of this separation determines the magnification factor. A shorter separation will provide a smaller magnification factor while a longer separation will provide a greater one.

Particular note should be given to the decentration and tilt tolerances. These tolerances are commonly given less than their due weight in the design of a lens system. In reality they are quite important if a lens system is to perform adequately.

Figure 2:
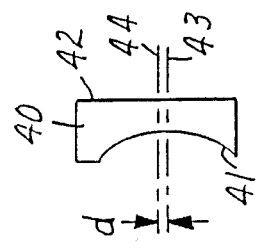
FIG. 2 illustrates the decentration defect.

Decentration is defined as the distance between the optical axis and the mechanical axis of the lens at the center of the lens. This is illustrated in FIG. 2. FIG. 2 shows a lens 40 having a concave surface 41 and a planar surface 42. The optical axis of the lens is shown as 43 while the mechanical axis of the lens is 44. These two axes are separated by a distance D which is the decentration of the lens.

Figure 3:
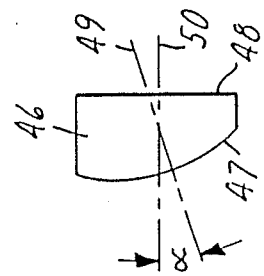
FIG. 3 illustrates the tilt defect.

Tilt is defined as the angle between the optical axis and the mechanical axis of the lens. This is illustrated in FIG. 3. FIG. 3 shows a lens 46 having a convex surface 47 and a planar surface 48. The optical axis of the lens is shown as 49 and the mechanical axis as 50. The angle α between the optical and mechanical axes of the lens is the tilt. When a lens is subject to both decentration and tilt the decentration is measured at the center of the lens.

As shown in FIG. 1, the preferred embodiment also includes a prism 26. Prism 26 allows the operator to rotate images to insure proper alignment for viewing or printing. When such a prism is used, image quality will be improved by including one or more collimating lenses. In the preferred embodiment a cemented doublet is utilized.

A further aspect of the preferred embodiment relates to the distance between object plane 10 and lens element 24. A cam is preferably used to vary this distance as the zoom space between elements 16 and 18 is varied. Thus an image which is in proper focus at one zoom setting will remain in focus as the zoom setting is varied thereby retaining the desired image resolution.

I claim:

1. A variable focal length lens systems for use in micrographic projectors and printers comprising lenses according to the following Table:

| ELEMENT | SURFACE | RADIUS OF CURVATURE | THICKNESS | SEPARATION | TOLERANCE | INDEX OF REFRACTION | DECENTRATION | TILT |
|---|---|---|---|---|---|---|---|---|
| 12 | S1 | −89.628 | 1.20 | | 0.10 | 1.83400– 37.3 ± 0.2 | 0.015 | 0.066 |
|  | S2 | 24.806 |  | 0.98 | 0.025 |  |  |  |
| 14 | S3 | −64.012 | 1.20 |  | 0.05 | 1.83400– 37.3 ± 0.2 | 0.020 | 0.048 |
|  | S4 | −297.992 |  | 2.55 | 0.025 |  |  |  |
| 16 | S5 | 43.005 | 2.10 |  | 0.05 | 1.74077– 27.8 ± 0.2 | 0.015 | 0.063 |
|  | S6 | −69.773 |  | 2.000– 27.896 |  |  |  |  |
| 18 | S7 | 97.970 | 2.20 |  | 0.05 | 1.77250– 49.6 ± 0.3 | 0.026 | 0.053 |
|  | S8 | −76.200 |  | 0.11 | 0.05 |  |  |  |
| 20 | S9 | 19.253 | 7.99 |  | 0.05 | 1.48749– 70.4 ± 0.4 | 0.020 | 0.053 |
|  | S10 | −29.940 |  |  | 0.05 |  |  |  |
| 22 | S11 | 17.797 | 6.90 |  |  |  |  |  |
|  |  |  |  | 1.26 | 0.03 | 1.64769– 33.8 ± 0.2 |  |  |
| 24 | S12 | 691.830 | 1.80 |  | 0.05 | 1.77250– 49.6 ± | 0.015 | 0.060 |
|  | S13 | −45.909 |  |  |  |  |  |  |

| SURFACE | RADIUS OF CURVATURE | THICKNESS | SEPARATION |
|---|---|---|---|
| S1 | −89.628 | 1.20 |  |
| S2 | 24.806 |  | 0.98 |
| S3 | −64.012 | 1.20 |  |
| S4 | −297.992 |  | 2.55 |
| S5 | 43.005 | 2.10 |  |
| S6 | −69.773 |  | 2.000– 27.896 |
| S7 | 97.970 | 2.20 |  |
| S8 | −76.200 |  | 0.11 |
| S9 | 19.253 | 7.99 |  |
| S10 | −29.940 |  | 6.90 |
| S11 | 17.797 |  | 1.26 |
| S12 | 691.830 | 1.80 |  |
| S13 | −45.909 |  |  |

| SURFACE | TOLERANCE | INDEX OF REFRACTION | DECENTRATION | TILT |
|---|---|---|---|---|
| S1 | 0.10 | 1.83400 | 0.015 | 0.066 |
| S2 | 0.025 |  |  |  |
| S3 | 0.05 | 1.83400 | 0.020 | 0.048 |
| S4 | 0.025 |  |  |  |
| S5 | 0.05 | 1.74077 | 0.015 | 0.063 |
| S6 |  |  |  |  |
| S7 | 0.50 | 1.77250 | 0.026 | 0.053 |
| S8 | 0.05 |  |  |  |
| S9 | 0.05 | 1.48749 | 0.020 | 0.053 |
| S10 | 0.05 |  |  |  |
| S11 | 0.03 | 1.64769 |  |  |
| S12 | 0.05 | 1.77250 | 0.015 | 0.060 |
| S13 |  |  |  |  |

2. The lens system of claim 1 further comprising a prism for rotating images produced by said lens system.

* * * * *